(12) United States Patent
Li et al.

(10) Patent No.: US 12,156,031 B2
(45) Date of Patent: Nov. 26, 2024

(54) BLOCK CHAIN-BASED SHORT MESSAGE VERIFICATION METHOD

(71) Applicants: QINGDAO HAIER WASHING MACHINE CO., LTD., Shandong (CN); Haier Smart Home Co., Ltd., Shandong (CN)

(72) Inventors: Yang Li, Qingdao (CN); Zhigang Shan, Qingdao (CN); Chen Zhao, Qingdao (CN); Heli Leng, Qingdao (CN); Yi Meng, Qingdao (CN); Pengfei Wu, Qingdao (CN); Xiaowei Wang, Qingdao (CN); Kejun Lin, Qingdao (CN); Kexin Lin, Qingdao (CN)

(73) Assignees: QINGDAO HAIER WASHING MACHINE CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 305 days.

(21) Appl. No.: 17/624,943

(22) PCT Filed: Jul. 1, 2020

(86) PCT No.: PCT/CN2020/099727
§ 371 (c)(1),
(2) Date: Jan. 5, 2022

(87) PCT Pub. No.: WO2021/004353
PCT Pub. Date: Jan. 14, 2021

(65) Prior Publication Data
US 2022/0286857 A1 Sep. 8, 2022

(30) Foreign Application Priority Data
Jul. 5, 2019 (CN) .......................... 201910606130.2

(51) Int. Cl.
*H04W 12/106* (2021.01)
*H04L 9/00* (2022.01)
(Continued)

(52) U.S. Cl.
CPC ......... *H04W 12/106* (2021.01); *H04L 9/3239* (2013.01); *H04L 9/50* (2022.05);
(Continued)

(58) Field of Classification Search
CPC ..... H04W 4/14; H04W 8/183; H04W 12/106; H04W 12/72; H04W 8/205; H04W 12/06;
(Continued)

(56) References Cited

U.S. PATENT DOCUMENTS 10,630,667 B2 * 4/2020 Zhang .................. H04L 63/08
2017/0310653 A1 * 10/2017 Zhang ................ H04L 63/0838
2017/0352027 A1 * 12/2017 Zhang ................. H04L 9/0825

FOREIGN PATENT DOCUMENTS

| CN | 107911819 A | * | 4/2018 | .......... H04L 9/0643 |
| CN | 109150546 A | | 1/2019 | |
| CN | 109345245 A | * | 2/2019 | ......... G06Q 20/3829 |

OTHER PUBLICATIONS

"An Introduction to Smart Contracts and Their Potential and Inherent Limitations"—Levi et al., Harvard Law School Forum on Corporate Governance, May 26, 2018 https://corpgov.law.harvard.edu/2018/05/26/an-introduction-to-smart-contracts-and-their-potential-and-inherent-limitations/ (Year: 2018).*

(Continued)

*Primary Examiner* — Randy A Scott
(74) *Attorney, Agent, or Firm* — Maier & Maier, PLLC

(57) ABSTRACT

A block chain-based short message verification method that includes a client randomly generating a sequence number and encrypting the sequence number; the client sending a mobile phone number and the encrypted sequence number to
(Continued)

a service end; the service end sending the mobile phone number and the encrypted sequence number to a short message operation end to store same in an intelligent contract of a block chain; the short message operation end randomly generating a verification code and sending the verification code to the client; the short message operation end encrypting the verification code and correspondingly storing a mobile phone number, the encrypted sequence number and the encrypted verification code into the intelligent contract of the block chain. Said method can prevent a server and a short message operator from impersonating a user for short message verification before the user performs verification, thereby improving the security of short message verification.

3 Claims, 3 Drawing Sheets

(51) Int. Cl.
| | |
|---|---|
| *H04L 9/32* | (2006.01) |
| *H04W 4/14* | (2009.01) |
| *H04W 8/18* | (2009.01) |
| *H04L 9/06* | (2006.01) |
| *H04L 9/40* | (2022.01) |

(52) U.S. Cl.
CPC ............. *H04W 4/14* (2013.01); *H04W 8/183* (2013.01); *H04L 9/0637* (2013.01); *H04L 9/0643* (2013.01); *H04L 9/3242* (2013.01); *H04L 63/08* (2013.01); *H04L 63/10* (2013.01)

(58) Field of Classification Search
CPC ....... H04L 9/3239; H04L 9/50; H04L 9/0637; H04L 9/3242; H04L 63/08; H04L 63/10
See application file for complete search history.

(56) References Cited

OTHER PUBLICATIONS

"Blokchain Smart Contracts are Finally Good for Something in the Real World"—Mike Orcutt, MIT Technology Review, Nov. 19, 2018 https://www.technologyreview.com/2018/11/19/139032/blockchain-smart-contracts-can-finally-have-a-real-world-impact/ (Year: 2018).*

International Search Report issued on Sep. 28, 2020 in corresponding International application No. PCT/CN2020/099727; 6 pages.

* cited by examiner

BLOCK CHAIN-BASED SHORT MESSAGE VERIFICATION METHOD

FIELD

The present disclosure belongs to the technical field of communication, and specifically provides a block chain-based short message verification method.

BACKGROUND

At present, short message verification is a commonly used verification method. In a traditional short message verification method, a user sends a request to a server through a client, and the server randomly generates a short message verification code, and then sends a content of short message to a short message operator; the short message operator issues a short message to the user, and the user verifies according to the verification code in the short message. In this process, the server and the short message operator already know the specific content of the verification code before the user verifies. Both the server and the short message operator may impersonate the user to verify. Moreover, once the array of the server is destroyed or tampered with, the user may not be able to perform normal verification operations. It can be seen that the security of the traditional short message verification method is low.

Accordingly, there is a need in the art for a new block chain-based short message verification method to solve the above problem.

SUMMARY

In order to solve the above problem in the prior art, that is, to solve the problem of low security of existing short message verification methods, the present disclosure provides a block chain-based short message verification method, which includes the following steps: a client randomly generating a serial number and encrypting the serial number; the client sending a mobile phone number and the encrypted serial number to a server; the server sending the mobile phone number and the encrypted serial number to a short message operator and storing them in a smart contract of a block chain; the short message operator randomly generating a verification code and sending the verification code to the client; and the short message operator encrypting the verification code, and storing the mobile phone number, the encrypted serial number, and the encrypted verification code correspondingly in the smart contract of the block chain.

In a preferred technical solution of the above short message verification method, after the step of "the short message operator storing the mobile phone number, the encrypted serial number, and the encrypted verification code correspondingly in the smart contract of the block chain", the short message verification method further includes: the client sending the mobile phone number, the verification code, and the encrypted serial number to the server; the server sending the mobile phone number, the verification code, and the encrypted serial number to the smart contract of the block chain; and the smart contract of the block chain performing verification and feeding back a verification result to the server.

In a preferred technical solution of the above short message verification method, the step of "the smart contract of the block chain performing verification and feeding back the verification result to the server" includes: the smart contract of the block chain using the mobile phone number and the encrypted serial number that are sent from the server to retrieve a corresponding verification code; comparing the retrieved verification code with the verification code sent from the server; if a comparison result indicates that the verification codes are consistent, then feeding back a result of passing the verification to the server; and if the comparison result indicates that the verification codes are inconsistent, then feeding back a result of failing the verification to the server.

In a preferred technical solution of the above short message verification method, the step of "encrypting the serial number" includes: performing MD5 or SHA encryption on the serial number.

In a preferred technical solution of the above short message verification method, the step of "encrypting the verification code" includes: performing MD5 or SHA encryption on the verification code.

In another aspect, the present disclosure also provides a block chain-based short message verification method, which includes the following steps: a client randomly generating a serial number and encrypting the serial number; a client sending a mobile phone number and the encrypted serial number to a server, so that the server sends the mobile phone number and the encrypted serial number to a short message operator and stores them in a smart contract of a block chain; and the client receiving a verification code randomly generated by the short message operator, in which after the verification code is encrypted by the short message operator, the verification code is correspondingly stored in the smart contract of the block chain together with the mobile phone number and the encrypted serial number.

In a preferred technical solution of the above short message verification method, after the step of "the client receiving the verification code randomly generated by the short message operator", the short message verification method further includes: the client sending the mobile phone number, the verification code and the encrypted serial number to the server, so that the server sends the mobile phone number, the verification code and the encrypted serial number to the smart contract of the block chain for verification and receives a verification result fed back by the smart contract of the block chain.

In further another aspect, the present disclosure also provides a block chain-based short message verification method, which includes the following steps: after a client randomly generates a serial number and encrypts the serial number, a server receiving a mobile phone number and the encrypted serial number that are sent from the client; the server sending the mobile phone number and the encrypted serial number to a short message operator and storing them in a smart contract of the block chain, so that the short message operator randomly generates a verification code and sends the verification code to the client, encrypts the verification code and stores the mobile phone number, the encrypted serial number, and the encrypted verification code correspondingly in the smart contract of the block chain.

In a preferred technical solution of the above short message verification method, after the step of "the server sending the mobile phone number and the encrypted serial number to the short message operator and storing them in the smart contract of the block chain, and the short message operator randomly generating the verification code and sending the verification code to the client, encrypting the verification code and storing the mobile phone number, the encrypted serial number, and the encrypted verification code correspondingly in the smart contract of the block chain", the short message verification method further includes: the server receiving the mobile phone number, the verification code, and the encrypted serial number that are sent from the client; the server sending the mobile phone number, the verification code, and the encrypted serial number to the smart contract of the block chain for verification; and the server receiving a verification result fed back from the smart contract of the block chain.

In still further another aspect, the present disclosure also provides a block chain-based short message verification method, which includes the following steps: after a client randomly generates a serial number, encrypts the serial number, and sends a mobile phone number and the encrypted serial number to a server, a short message operator receiving the mobile phone number and the encrypted serial number that are sent from the server, in which the mobile phone number and the encrypted serial number are also stored by the server in a smart contract of a block chain; the short message operator randomly generating a verification code and sending the verification code to the client; and the short message operator encrypting the verification code, and storing the mobile phone number, the encrypted serial number, and the encrypted verification code correspondingly in the smart contract of the block chain.

It can be understood by those skilled in the art that in the preferred technical solutions of the present disclosure, verification information is divided into two parts, one of which is the serial number, and the other part of which is the verification code. Moreover, the serial number is encrypted by the client, so the short message operator cannot obtain the original text of the serial number, and the short message operator cannot impersonate the user to verify. In addition, the verification code generated by the short message operator is encrypted and then stored in the smart contract of the block chain, so that the server cannot obtain the verification code before the user verifies. There is no possibility of the server leaking the verification code or tampering with the verification code, and the server also cannot impersonate the user to verify, that is, neither the server nor the short message operator can impersonate the user to verify before the user verifies. In addition, since the serial number and the verification code are both encrypted and then stored in the smart contract of the block chain, even if in an open environment, the verification code and the serial number will not be at risk of being stolen. Through this short message verification method, the security of short message verification can be greatly improved.

DETAILED DESCRIPTION

Preferred embodiments of the present disclosure will be described below with reference to the accompanying drawings. It should be understood by those skilled in the art that these embodiments are only used to explain the technical principles of the present disclosure, and are not intended to limit the scope of protection of the present disclosure.

Based on the problem pointed out in the "BACKGROUND OF THE INVENTION" that the security of the existing short message verification methods is low, the present disclosure provides a block chain-based short message verification method, aiming at improving the security of short message verification.

Figure 1:
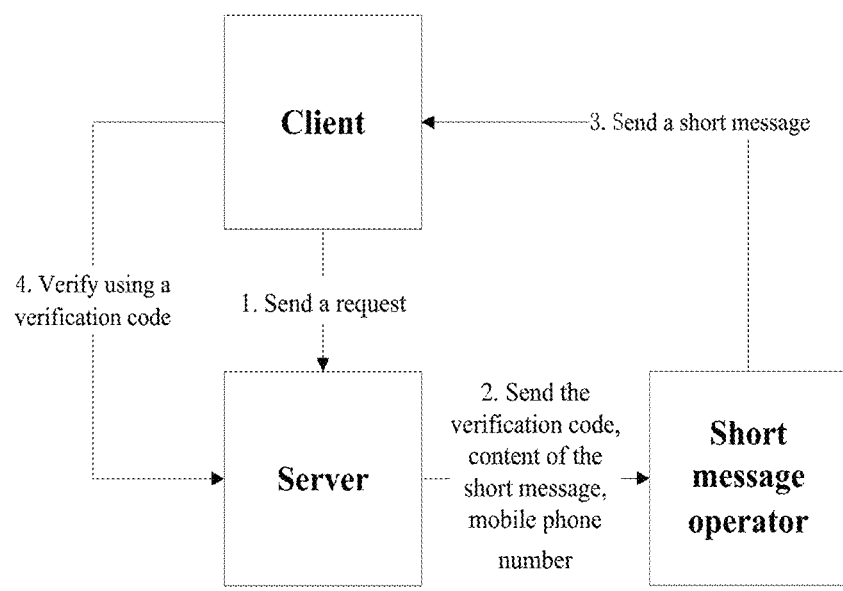
FIG. 1 is a flowchart of a short message verification method in the prior art.
Figure 2:
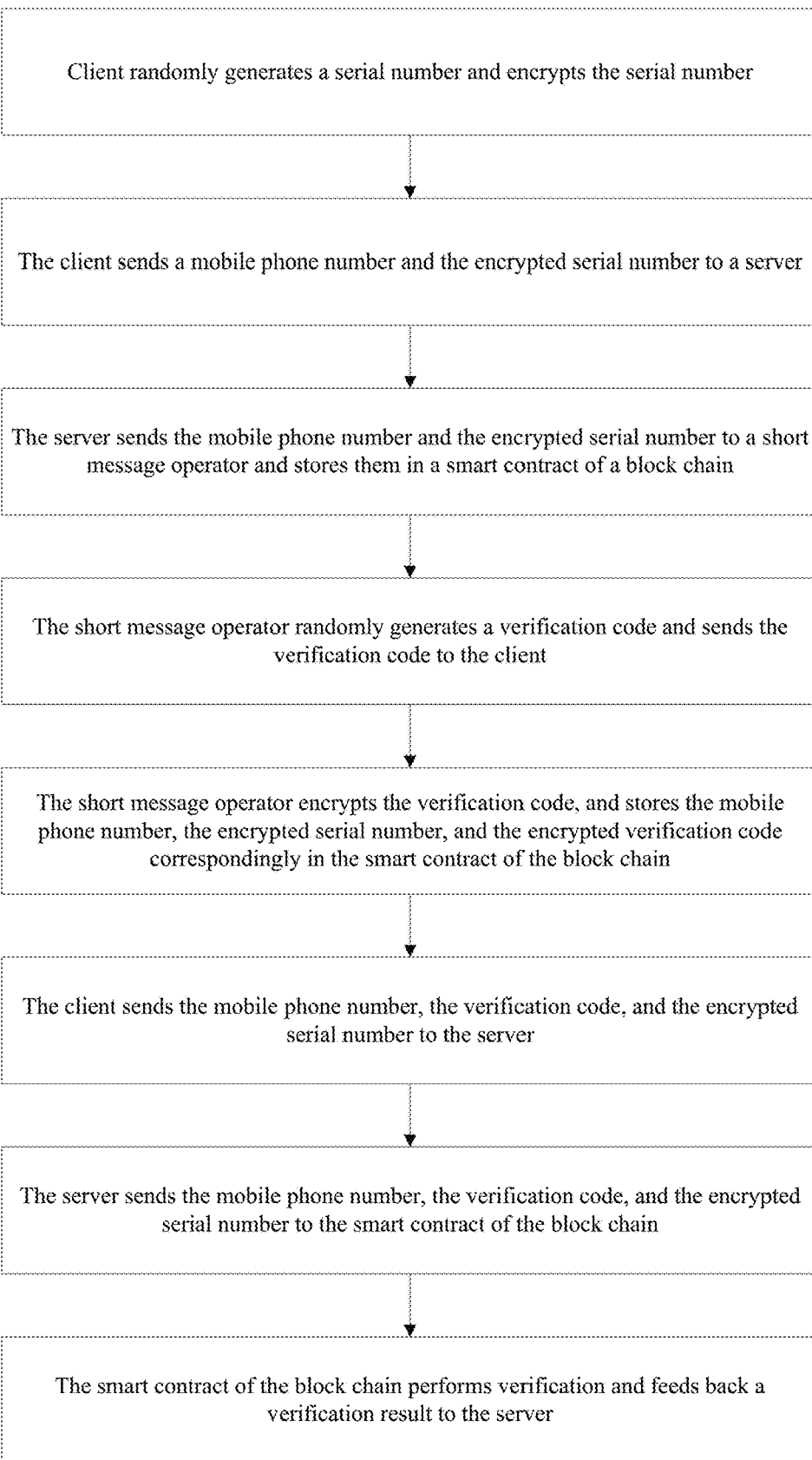
FIG. 2 is a flowchart of a short message verification method of the present disclosure.
Figure 3:
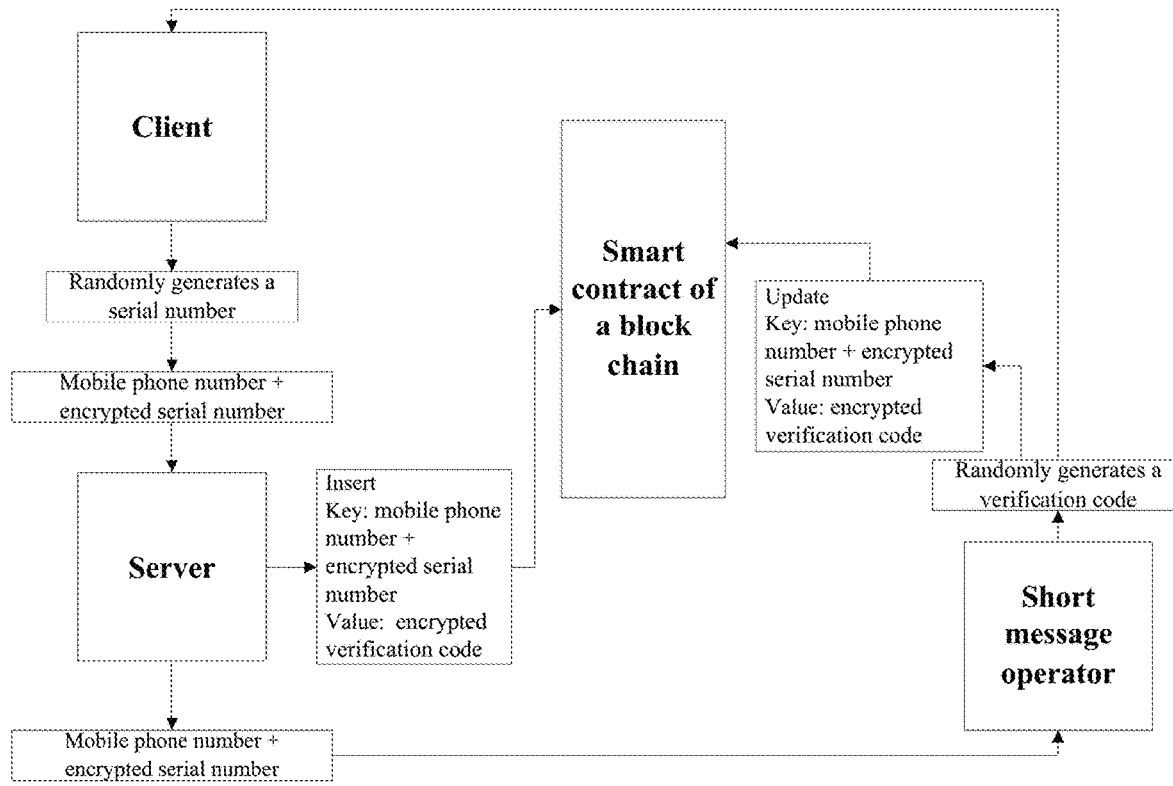
FIG. 3 is a schematic diagram of a sending process of the short message verification method of the present disclosure.
Figure 4:
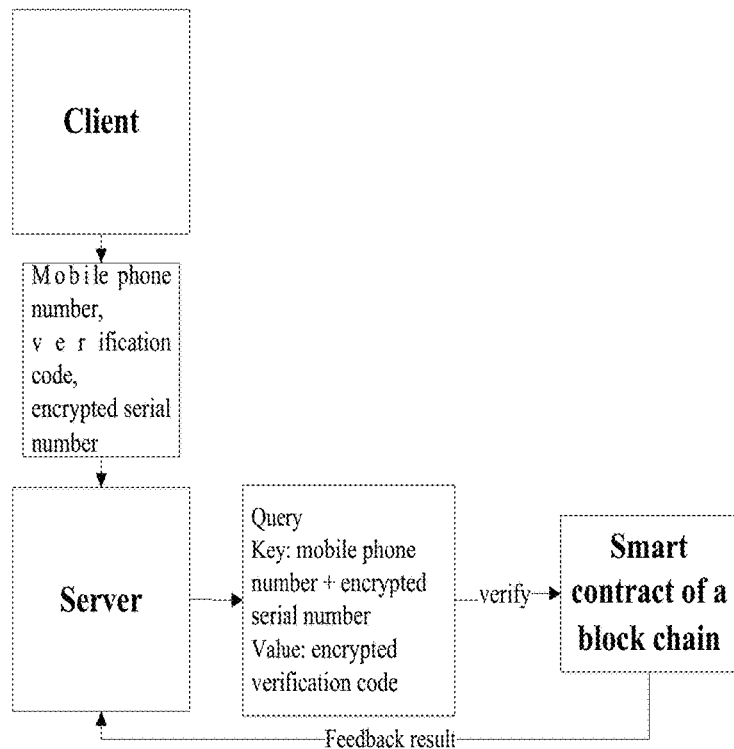
FIG. 4 is a schematic diagram of a verification process of the short message verification method of the present disclosure.

Specifically, as shown in FIG. 1, the short message verification method of the present disclosure includes the following steps: a client randomly generating a serial number and encrypting the serial number; a client sending a mobile phone number and the encrypted serial number to a server; the server sending the mobile phone number and the encrypted serial number to a short message operator and storing them in a smart contract of a block chain; the short message operator randomly generating a verification code and sending the verification code to the client; and the short message operator encrypting the verification code, and storing the mobile phone number, the encrypted serial number, and the encrypted verification code correspondingly in the smart contract of the block chain. MD5 irreversible encryption may be used by the client to encrypt the serial number, and MD3, MD4, or SHA irreversible encryption may also be used. Of course, other irreversible encryptions may also be used. Those skilled in the art may flexibly set the specific method the client uses to encrypt the serial number in practical applications. Such adjustments and changes to the specific method the client uses to encrypt the serial number do not constitute limitations to the present disclosure, and should be defined within the scope of protection of the present disclosure. Similarly, MD5 irreversible encryption may be used by the short message operator to encrypt the verification code, and MD3, MD4, or SHA irreversible encryption may also be used. Of course, other irreversible encryptions may also be used. Those skilled in the art may flexibly set the specific method the short message operator uses to encrypt the verification code in practical applications. Such adjustments and changes to the specific method the short message operator uses to encrypt the verification code do not constitute limitations to the present disclosure, and should be defined within the scope of protection of the present disclosure. The aforementioned MD5 refers to a MD5 message digest algorithm (i.e., Message-Digest Algorithm 5), and the aforementioned SHA refers to a secure hash algorithm.

It should be noted that when the server stores the mobile phone number and the encrypted serial number in the smart contract of the block chain, the server stores the mobile phone number and the encrypted serial number as a key in the smart contract of the block chain; at this time, the key does not have a corresponding value. When the short message operator stores the mobile phone number, the encrypted serial number, and the encrypted verification code in the smart contract of the block chain, the short message operator stores the mobile phone number and the encrypted serial number as a key and stores the encrypted verification code as a value in the smart contract of the block chain correspondingly in an update mode (i.e., the mobile phone number, the encrypted serial number and the encrypted verification code are stored in the smart contract of the block chain in a one-to-one correspondence). At this time, the key has a corresponding value, that is, the key of the mobile phone number and the encrypted serial number corresponds to the value of the encrypted verification code.

In addition, it should also be noted that the client of the present disclosure may be the user's mobile phone or tablet computer, etc., and those skilled in the art may flexibly set the specific type of the client in practical applications.

After the step of "the short message operator storing the mobile phone number, the encrypted serial number, and the encrypted verification code correspondingly in the smart contract of the block chain", the short message verification method of the present disclosure further includes: the client sending the mobile phone number, the verification code, and the encrypted serial number to the server; the server sending the mobile phone number, the verification code, and the encrypted serial number to the smart contract of the block chain; and the smart contract of the block chain performing verification and feeding back a verification result to the server. In the verification process, although the server obtains the verification code, the server cannot impersonate the user to verify during the user's verification process since it is the encrypted serial number that the server obtains, which further improves the security of short message verification. In addition, as an alternative, in practical applications, if the short message operating mechanism changes, the user can also use the client to directly send the mobile phone number, the verification code and the encrypted serial number to the smart contract of the block chain during the user's verification phase, and then the smart contract of the block chain will feedback the verification result to the server. Of course, in practical applications, in the verification phase, the client can also send the mobile phone number, the original text of the verification code, and the original text of the serial number to the server, and the server then sends the mobile phone number, the original text of the verification code, and the serial number (which may be the original text of the serial number, or a serial number re-encrypted by the server) to the smart contract of the block chain for verification.

Preferably, the step of "the smart contract of the block chain performing verification and feeding back the verification result to the server" includes: the smart contract of the block chain using the mobile phone number and the encrypted serial number that are sent from the server to retrieve a corresponding verification code; comparing the retrieved verification code with the verification code sent from the server; if a comparison result indicates that the verification codes are consistent, then feeding back a result of passing the verification to the server; and if the comparison result indicates that the verification codes are inconsistent, then feeding back a result of failing the verification to the server. Specifically, when the server verifies the mobile phone number, the verification code, and the encrypted serial number that are sent from the client, the server sends the mobile phone number, the verification code, and the encrypted serial number to the smart contract of the block chain for verification. In the verification process, the corresponding value (the encrypted verification code) is retrieved through the key (the mobile phone number and the encrypted serial number), and then the retrieved verification code is compared with the verification code sent from the server. If the comparison result indicates that they are consistent, the smart contract of the block chain will feed back a result of passing the verification to the server, and the server responds to the user's operation. If the comparison results indicates that they are inconsistent, the smart contract of the block chain will feedback a result of failing the verification to the server, and the server does not respond to the user's operation. It should be noted that in practical applications, if the framework of the block chain is Ethereum, the smart contract thereof is solidify language, and the encryption method of the serial number and the verification code may be SHA encryption; and if the framework of the block chain is Fabric, the smart contract thereof is go language, and MD5 encryption may be selected for the encryption method of the serial number and the verification code.

Hitherto, the technical solutions of the present disclosure have been described in connection with the preferred embodiments shown in the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features, and all the technical solutions after these changes or replacements will fall within the scope of protection of the present disclosure.

What is claimed is:

1. A block chain-based short message verification method, comprising:
   a client randomly generating a serial number and encrypting the serial number;
   the client sending a mobile phone number and the encrypted serial number to a server;
   the server sending the mobile phone number and the encrypted serial number to a short message operator and storing them in a smart contract of a block chain;
   the short message operator randomly generating a verification code and sending the verification code to the client; and
   the short message operator encrypting the verification code, and storing the mobile phone number, the encrypted serial number, and the encrypted verification code correspondingly in the smart contract of the block chain,
   wherein after the short message operator stores the mobile phone number, the encrypted serial number, and the encrypted verification code correspondingly in the smart contract of the block chain, the method further comprises:
   the client sending the mobile phone number, the verification code, and the encrypted serial number to the server;
   the server sending the mobile phone number, the verification code, and the encrypted serial number to the smart contract of the block chain; and
   the smart contract of the block chain performing verification and feeding back a verification result to the server; and
   wherein the smart contract of the block chain performing verification and feeding back the verification result to the server comprises:
   the smart contract of the block chain using the mobile phone number and the encrypted serial number that are sent from the server to retrieve a corresponding verification code; and
   comparing the retrieved verification code with the verification code sent from the server; if a comparison result indicates that the retrieved verification code and the verification code sent from the server are consistent, then feeding back a result of passing the verification to the server; and
   if the comparison result indicates that the retrieved verification code and the verification code sent from the server are inconsistent, then feeding back a result of failing the verification to the server.

2. The short message verification method according to claim 1, wherein the encrypting of the serial number comprises:

performing MD5 or SHA encryption on the serial number.

3. The short message verification method according to claim 1, wherein the encrypting of the verification code comprises:

performing MD5 or SHA encryption on the verification code.

* * * * *